United States Patent [19]

Franks et al.

[11] 4,359,641
[45] Nov. 16, 1982

[54] LIQUID SCINTILLATORS FOR OPTICAL FIBER APPLICATIONS

[75] Inventors: Larry A. Franks; Stephen S. Lutz, both of Santa Barbara, Calif.

[73] Assignee: The United States of America as represented by the United States Department of Energy, Washington, D.C.

[21] Appl. No.: 269,287

[22] Filed: Jun. 1, 1981

[51] Int. Cl.³ .......................... G01J 1/58; G09K 11/06
[52] U.S. Cl. ............................ 250/486.1; 252/301.17; 250/483.1
[58] Field of Search .................. 250/483, 456; 252/301.17

[56] References Cited

U.S. PATENT DOCUMENTS

| | | | |
|---|---|---|---|
| 3,444,089 | 5/1969 | Carter et al. | 252/301.17 |
| 3,600,445 | 8/1971 | Wirth et al. | 568/633 |
| 3,644,211 | 2/1972 | Hellen | 252/301.17 |
| 3,673,100 | 6/1972 | Benson | 252/301.17 X |
| 3,677,964 | 7/1972 | Webb | 252/364 |
| 3,711,421 | 1/1973 | Krumbiegel et al. | 252/408 |
| 3,886,082 | 5/1975 | Hyman | 252/301.17 |
| 3,928,227 | 12/1975 | Sena et al. | 252/301.17 |
| 3,939,094 | 2/1976 | Kauffman | 252/301.17 |
| 3,984,332 | 10/1976 | Nelson et al. | 250/368 |
| 3,991,318 | 11/1976 | Duguay | 250/578 |
| 4,001,139 | 1/1977 | Long | 252/301.17 |
| 4,017,738 | 4/1977 | Hyman et al. | 250/482 |
| 4,127,439 | 11/1978 | Chew et al. | 252/301.17 |

OTHER PUBLICATIONS

Kallman et al. Scintillation Digest, vol. 8, No. 3, pp. 32–39 (1951).

*Primary Examiner*—F. Edmundson

[57] ABSTRACT

A multicomponent liquid scintillator solution for use as a radiation-to-light converter in conjunction with a fiber optic transmission system. The scintillator includes a quantity of 1, 2, 4, 5, 3H, 6H, 1 OH, tetrahydro-8-trifluoromethyl (1) benzopyrano (9, 9a, 1-gh) quinolizin-10-one (Coumarin) as a solute in a fluor solvent such as benzyl alcohol or pseudo-cumene. The use of BIBUQ as an additional or primary solute is also disclosed.

6 Claims, 3 Drawing Figures

LIQUID SCINTILLATORS FOR OPTICAL FIBER APPLICATIONS

The invention described herein was made in the course of Contract DE-AC08-76NV01183 with the U.S. Department of Energy.

TECHNICAL FIELD

This disclosure relates to liquid scintillator systems meeting the requirements of long wavelength emission and short impulse response necessary for long path, wide bandwidth optical fiber applications. Such systems are used for radiation detection and transmission of information in the form of light pulses corresponding to the radiation. The system is characterized by a new radiation-to-light converter of the type commonly called a "fluor" or a scintillator.

BACKGROUND ART

Low loss optical fibers are finding increasing application in plasma diagnostics, particularly when immunity to electromagnetic interference and wide bandwidth are required. The fibers normally serve to transmit a light pulse, generated in a radiation-to-light converter, to a remote photodetector. Under some conditions, Cerenkov light generated by relativistic electrons in the fiber itself suffices to characterize the radiation environment. An example of such a system is described in U.S. Pat. No. 3,984,332, issued Oct. 5, 1976. This disclosure is concerned with the more general case where the light is generated in a liquid or plastic scintillator.

The detection of radiation is commonly accomplished utilizing a transducer which responds to the radiation in a manner which can be used to generate an electrical signal corresponding to some characteristic of the radiation. The electrical signal is transmitted over electric cables, commonly coaxial cables, to a location remote from the transducer for processing. However, the transmission characteristics of coaxial cables are such that significant distortion of information can occur, particularly in pulses of duration shorter than about 5 nsec.

The advent of commercially available fiber optic wave guides, commonly called optical fibers, has stimulated interest in their practical application to information gathering and transmitting systems. Since the fibers have inherently greater information-carrying capacity than coaxial cables, their use as signal-carrying means in place of coaxial cables is, potentially, very attractive. With respect to systems for detecting and transmitting intelligence regarding radiation, U.S. Pat. No. 3,984,332 to Melvin A. Nelson, Terence J. Davies, and John R. Morton, III, assignors to the assignee of the instant application, is of interest. That patent, entitled "Radiation Detection System," is directed to a system wherein the optical fiber serves as both the detector and the transmission means. Cerenkov light generated in a lightly guide by charged particle radiation is transmitted along the guide to a remote location for processing.

The optical transmission and material dispersion characteristics of known fiber optic wave guides vis-a-vis the output characteristics of known transducers which convert radiation to light have impeded the development of practical systems wherein the optical fibers serve only as the transmission means. This has been particularly true when requirements of the radiation detection system combine wide bandwidth with long transmission lengths, i.e., bandwidths greater than about 50 MHz and lengths greater than about 300 m. Such practical systems require radiation-to-light converters having emission wavelengths long enough to minimize absorption in the fiber which varies approximately as $1/\lambda^4$ where $\lambda$ is the wavelength. In addition, where the radiation to be detected is a very fast transient pulse, such as occurs in connection with a nuclear explosion, it is necessary for diagnostic purposes that the decay time of the light emission be very short, less than a few nanoseconds for some purposes.

Presently available long wavelength fluors (500 to above 600 nm) have decay times in excess of about 15 ns. This places serious bandwidth limitations on a fluor-fiber system. On the other hand, commercial fluors which do have short decay times have emission maxima less than about 430 nm.

In copending patent application Ser. No. 949,163, filed Oct. 6, 1978, now U.S. Pat. No. 4,292,527 which is hereby incorporated into this disclosure, there is described a radiation detection system which uses a radiation-to-light converter in combination with an optical fiber that transmits light produced by the converter to a remote location for recording, display and other processing steps. That disclosure also describes several fluors suitable for use in radiation detection systems which utilize optical fibers as a means to transmit information regarding the radiation. These radiation-in-light converters produce light having characteristics peculiarly matched to the transmission characteristics of optical fibers.

While the emission wavelength and decay time of the scintillator are dictated by the specific application, minimum requirements are considered to be 500 nm emission, a response (full width at half maximum or FWHM) to a delta function input of 2 ns, and conversion efficiency comparable to conventional plastic scintillators. While progress has been made in developing such scintillators, as evidenced by the disclosure of patent application Ser. No. 949,163, a scintillator optimized for fibers is not yet commercially available.

This disclosure relates to two liquid scintillator systems based on use of 1, 2, 4, 5, 3H, 6H, 1 OH, tetrahydro-8-trifluoromethyl (1) benzopyrano (9, 9a, 1-gh) quinolozin-10-one, available as Coumarin 540-A, obtained from Exciton Chemicals of Dayton, Ohio. This dye is alternately called Coumarin-153. It provides long wavelength emitting scintillators with relatively high efficiencies, but with temporal characteristics more comparable to fast conventional blue scintillators.

DISCLOSURE OF INVENTION

The present invention comprises a scintillator capable of performing as a radiation-to-light converter in combination with an optical fiber, wherein the scintillator is composed of Coumarin 540-A as a solute in a suitable solvent system.

It is an object of the invention to provide a scintillator which generates light in response to radiation, for practical transmission through optical fibers.

Another object of this invention is to provide a scintillator having the long wavelength emission and short decay time required for optimal performance in transmission of light pulses through optical fibers.

BEST MODES FOR CARRYING OUT THE INVENTION

Figure 1:
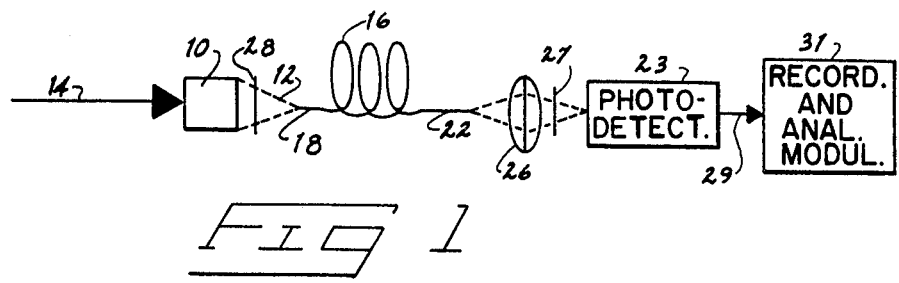
FIG. 1 is a schematic representation of a radiation detection system for use in conjunction with the scintillators.

Referring now to FIG. 1, which schematically illustrates the system, a radiation-to-light converter 10 emits light 12 when subjected to radiation 14. A substantial portion of the emitted light 12 should be at a wavelength greater than 500 nm and have a decay time less than about 2 ns in order to provide an appropriate match with the optical transmission characteristics of fiber optic wave guide 16. Emitted light 12 is received at one end 18 of guide 16, transmitted therethrough and emitted at the other end 22. It is then detected by a suitable photodetector 23 after suitable processing, such as by lens 26 and filter 27, if desired. A filter 28 between fluor 10 and fiber receiving end 18 in place of, or in addition to, filter 27 may be preferable in some applications. The output 29 of photodetector 23, which is representative of radiation 14, is then available for display, recording, analysis, and/or other processing, such as by recording and analysis modules 31.

The constituents of the fluors of scintillators for the radiation-to-light converter 10 utilizes Coumarin 540-A as a primary or secondary solute, together with a suitable solvent, such as benzyl alcohol or pseudo-cumene.

The scintillators described herein were excited during experimental tests with 50-psec (FWHM) bursts of 6-MeV electrons at 360 pps from an L-band linear accelerator (LINAC). Peak electron currents used during the measurements typically ranged from 50 to 500 mA.

Actual experiments utilizing the scintillators were performed with the scintillators contained in 2 cm diameter by 1 cm long fused silica cells. The fluorescent emissions were collected by a 3 m length of 1 mm core diameter plastic clad silica fiber (from Quartz Products Corporation, of Plainfield, N.J.) placed 135° from the direction of the beam. This viewing angle was selected to minimize the contribution of Cerenkov radiation to the detected signal. An f/4.2 monochromator was used to spectrally analyze the fluorescence. A 600 lines/nm grating and 20 mm slits were employed which give a spectral resolution of approximately 16 nm. Electron excited emission spectra were recorded by remotely scanning the monochromator while sampling the peak of the temporal pulse. The wavelength response of the entire optical system was determined by placing the optical fiber directly in the electron beam at an angle of approximately 47° and recording the Cerenkov emission intensity as a function of wavelength and using its $1/\lambda^3$ wavelength dependence as a correction factor. Relative sensitivity ratios between experimental setups were obtained by measuring a standard, commercially available, orange plastic scintillator, NE-108 (from Nuclear Enterprises, Inc., of San Carlos, California) at 570 nm. Variations in electron beam current were recorded by measuring the charge collected on a Faraday cup placed in the beam directly behind the scintillator cell.

Photomultiplier detectors were utilized in the course of the measurements to monitor the spectral and bandwidth characteristics of the various scintillator systems. The impulse response of each system is set out in Table 1. The fluorescence time response data presented in Table 1 are not corrected for system response. The photomultiplier detector outputs were recorded on a sampling oscilloscope and processed on an associated analysis system.

TABLE 1

Emission of Scintillator Systems

| Line Number | Base | Primary | Concentration (m) | Secondary | Concentration | Rise Time | FWHM (ns) | $\tau e$ (ns) | Integral $\epsilon$ | Peak $\epsilon$ | $\lambda$ (nm) |
|---|---|---|---|---|---|---|---|---|---|---|---|
| 1 | NE-108 | — | — | — | — | 3.9 | 17.9 | 12.9 | 1.0 | 1.0 | 570 |
| 2 | B.A. | C-540-A | $3.2 \times 10^{-3}$ | — | — | 2.5 | 13.1 | 9.0 | 0.23 | 0.33 | 540 |
| 3 | B.A. | C-540-A | $6.5 \times 10^{-3}$ | — | — | 2.5 | 11.7 | 8.3 | 0.33 | 0.51 | 540 |
| 4 | B.A. | C-540-A | $1.6 \times 10^{-2}$ | — | — | 1.9 | 9.0 | 6.4 | 0.41 | 0.82 | 540 |
| 5 | B.A. | C-540-A | $3.2 \times 10^{-2}$ | — | — | 1.6 | 7.2 | 5.4 | 0.37 | 0.88 | 540 |
| 6 | B.A. | C-540-A | $6.5 \times 10^{-2}$ | — | — | 0.9 | 5.0 | 4.5 | 0.29 | 0.99 | 540 |
| 7 | B.A. | C-540-A | $2.0 \times 10^{-1}$ | — | — | 0.7 | 2.9 | 3.0 | 0.15 | 0.83 | 560 |
| 8 | B.A. | C-540-A | $3.9 \times 10^{-1}$ | — | — | 0.5 | 1.4 | 1.3 | 0.05 | 0.60 | 570 |
| 9 | P.C. | C-540-A | $3.0 \times 10^{-3}$ | — | — | 2.2 | 10.5 | 9.7 | 1.0 | 1.6 | 485 |
| 10 | P.C. | C-540-A | $1.6 \times 10^{-2}$ | — | — | 1.2 | 6.1 | 6.2 | 1.2 | 3.1 | 495 |
| 11 | P.C. | C-540-A | $3.2 \times 10^{-2}$ | — | — | 0.68 | 4.0 | 3.7 | 0.8 | 3.1 | 480 |
| 12 | P.C. | C-540-A | $6.5 \times 10^{-2}$ | — | — | 0.23 | 2.4 | 2.7 | 0.5 | 2.9 | 495 |
| 13 | P.C. | C-540-A | $1.3 \times 10^{-1}$ | — | — | 0.20 | 1.2 | 1.3 | 0.2 | 2.3 | 500 |
| 14 | P.C. | C-540-A | $1.9 \times 10^{-1}$ | — | — | 0.18 | 0.58 | 0.66 | 0.1 | 1.8 | 500 |
| 15 | P.C. | C-540-A | $2.6 \times 10^{-1}$ | — | — | 0.16 | 0.43 | 0.52 | 0.08 | 1.5 | 530 |
| 16 | P.C. | C-540-A | $3.2 \times 10^{-1}$ | — | — | 0.17 | 0.35 | 0.37 | 0.06 | 1.5 | 525 |
| 17 | P.C. | BIBUQ | $1.5 \times 10^{-2}$ | C-540-A | $3.2 \times 10^{-3}$ | 1.4 | 6.6 | 6.6 | 1.8 | 4.4 | 490 |
| 18 | P.C. | BIBUQ | $1.5 \times 10^{-2}$ | C-540-A | $6.5 \times 10^{-3}$ | 1.0 | 5.8 | 6.0 | 1.6 | 4.4 | 485 |
| 19 | P.C. | BIBUQ | $1.5 \times 10^{-2}$ | C-540-A | $1.6 \times 10^{-2}$ | 0.85 | 4.6 | 5.1 | 1.3 | 4.4 | 485 |
| 20 | P.C. | BIBUQ | $1.5 \times 10^{-2}$ | C-540-A | $3.2 \times 10^{-2}$ | 0.43 | 3.4 | 3.8 | 0.9 | 3.8 | 490 |
| 21 | P.C. | BIBUQ | $1.5 \times 10^{-2}$ | C-540-A | $6.5 \times 10^{-2}$ | 0.24 | 2.1 | 2.4 | 1.0 | 3.6 | 500 |
| 22 | P.C. | BIBUQ | $1.5 \times 10^{-2}$ | C-540-A | $1.6 \times 10^{-1}$ | 0.18 | 0.72 | 0.94 | 0.16 | 2.6 | 520 |
| 23 | P.C. | BIBUQ | $1.5 \times 10^{-2}$ | C-540-A | $3.2 \times 10^{-1}$ | 0.15 | 0.36 | 0.35 | 0.06 | 1.7 | 518 |

EXAMPLE I

Figure 2:
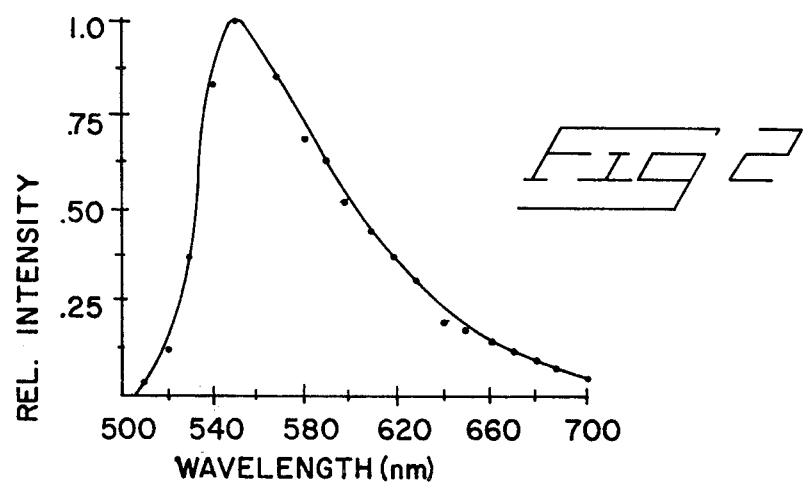
FIG. 2 illustrates the emission spectrum of Coumarin 540-A in benzyl alcohol.

A series of binary liquid scintillators were prepared with Coumarin 540-A dissolved in benzyl alcohol (B.A.). Relative intensity and temporal parameters were measured at room temperature over a concentration range of 0.003 to 0.39 molar. A corrected emission spectrum obtained under LINAC excitation for a 0.065 molar solution is shown in FIG. 2. Of significance in this spectrum is the 550 nm emission maximum and, for fiber applications, the long wavelength emission tail. Due to self-absorption, the emission maxima of these solutions are concentration dependent; the maxima at 0.006 molar occurs at approximately 545 nm and is shifted to 570 nm at 0.39 molar.

The data from this series of tests are summarized in rows 2-8 of Table 1. The impulse response, peak intensities and the time interval of the intensity are recorded for each concentration of the solute and compared to use of NE-108. The series is characterized by a steadily decreasing FWHM (and $\tau_e$) with increasing concentration and by a relative intensity which peaks in the region of 0.065 molar. A response better than 2 nsec was achieved in the scintillator at the 0.39 molar level, with a peak intensity (at 570 nm) of 60% of that of NE-108. Essentially, the same temporal values were in fact measured at 600 nm where the relative intensity is 0.3.

The emission maximum of this dye-solvent system is well suited for optical fiber applications. Additionally, the system offers, through its concentration dependence, a convenient means of adjusting the emission parameters over a relatively broad range.

EXAMPLE II

A series of scintillators was prepared with pseudo-cumene (P.S.) substituted for benzyl alcohol as the Coumarin 540-A solvent. The pseudo-cumeme would be expected to be a superior solvent because of its high G value for excited singlet states. This was found to be the case as is illustrated in both the time response and relative intensity data of Table 1 (rows 9-16). The relative intensity parameters of these systems peak at lower concentrations than with benzyl alcohol. The temporal values are all faster at comparable concentrations. A full width of 1.2 nsec was measured at 0.13 molar, where the relative peak intensity was 2.3 times that of the standard NE-108 systems. We note, however, that the fluorescence emission maxima are shifted to shorter wavelengths in this solvent as are indicated by the λ values of the second to last column of the Table. These latter values are close to the emission maximum for each formulation.

EXAMPLE III

Figure 3:
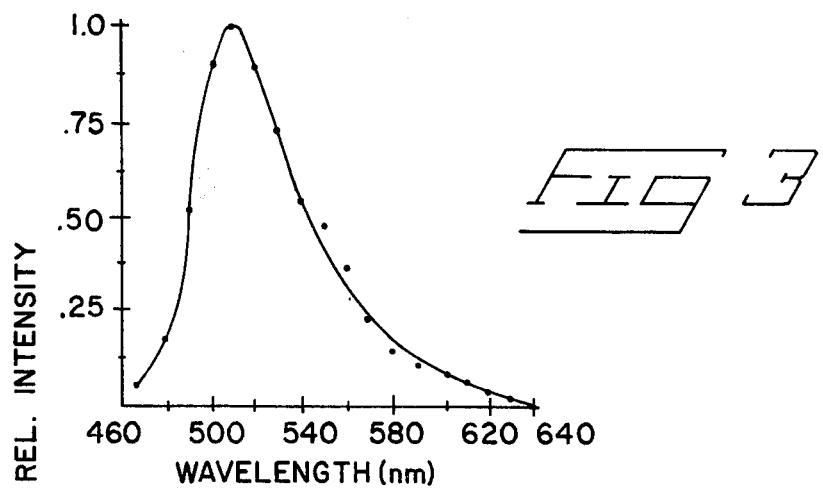
FIG. 3 illustrates the emission spectrum of Coumarin 540-A in a ternary system.

Testing of a ternary liquid scintillator using 4, 4'''-DI (2 Butyloctoxyl-1)- P-Quaterphenyl, or "BIBUQ" (primary solute) and Coumarin 540-A (secondary solute) in pseudo-cumene (solvent) again involved exciting the scintillator by 50-psec bursts of 6-MeV electrons. The resulting corrected emission spectrum is shown in FIG. 3. Emissions were observed at approximately 500 nm (emission peak). The performance of this system was found to be dependent on the concentration of Coumarin 540-A. The results are listed in rows 17-23 of Table 1. Fluorescent intensity was at a maximum at Coumarin 540-A concentrations less than 0.02 molar. In this concentration range, the resulting efficiencies measured at the peak of their respective emission bands were approximately 4.5 times greater than those of NE-108. The FWHM response time was observed to decrease continually with increasing Coumarin 540-A concentration. At the highest tested Coumarin 540-A concentration (0.32 molar) the scintillator FWHM response time was measured to be 350 psec. This number included a 210 psec detection system response time. At this concentration (0.32 molar), the Coumarin 540-A solute is in a super-saturated solution.

The role of BIBUQ in this system is to increase energy transfer efficiency from the pseudo-cumene to the Coumarin 540-A. This effect is most pronounced at low Coumarin 540-A concentrations (see Table 1). The BIBUQ-Coumarin 540-A ternary liquid scintillator is believed to offer the highest efficiency and shortest impulse response (in terms of FWHM) of any fluors reported to this date within this wavelength range.

What is claimed is:

1. A radiation-to-light converter comprising a combination of a fluor solvent and at least one fluor solute, wherein said solute is 1, 2, 4, 5, 3H, 6H, 1 OH, tetrahydro-8-trifluoromethyl (1) benzopyrano (9, 9a, 1-gh) quinolizin-10-one.

2. A radiation-to-light converter as set out in claim 1 wherein the solvent is benzyl alcohol.

3. A radiation-to-light converter as set out in claim 1 wherein the solvent is pseudo-cumene.

4. A radiation-to-light converter as set out in claim 1 wherein the solvent is pseudo-cumene and further comprising a quantity of BIBUQ as a primary solute.

5. A method of detecting and measuring ionizing radiation comprising exposing to high energy particles a measured solution containing 1, 2, 4, 5, 3H, 6H, 1 OH, tetrahydro-8-trifluoromethyl (1) benzopyrano (9, 9a, 1-gh) quinolizin-10-one and transmitting the resulting light pulses through an optical fiber.

6. A method as set out in claim 5 wherein the solution further contains BIBUQ.

* * * * *